Patented Sept. 2, 1947

2,426,863

UNITED STATES PATENT OFFICE 2,426,863

DIALLYL ETHER OF 2-BUTENE-1,4-DIOL

George F. Deebel, Dayton, Ohio, assignor to Monsanto Chemical Company, a corporation of Delaware No Drawing. Application December 12, 1942, Serial No. 468,819

1 Claim. (Cl. 260—615)

The present invention provides the diallyl ether of 2-butene-1,4-diol.

According to this invention the 1,4-diallyloxy-2-butene may be obtained by reaction of 1,4-dichlor-2-butene with an alkali metal alcoholate of allyl alcohol.

The diallyl ether of 2-butene-1,4-diol is particularly valuable as a cross-linking agent for the preparation of synthetic resinous materials. The presence of the olefinic bond in the diallyl ether, moreover, enables the production of a wide variety of compounds therefrom by reaction of the same with compounds that are known to add to the double bond.

Although I am aware of the fact that 1,4-diethoxy-2-butene has been previously prepared by reaction of 1,4-dibromo-2-butene with sodium alcoholate, the present invention provides a more industrially feasible process for the preparation of the diallyl ether of 2-butene-1,4-diol by employing the readily available 1,4-dichloro-2-butene.

I obtain the diallyl ether of 2-butene-1,4-diol by proceeding substantially as follows:

The 1,4-dichlorobutene-2 is added rapidly with good mixing to from 2 to 3 molecular equivalents of the appropriate alkali metal allylate. Inasmuch as the reaction is strongly exothermic, too high a temperature must be avoided, as side reactions forming vinyl acetylene and 1-chlorobutadiene-1,3 take place very readily. However, by operating at moderate temperatures, e. g., at temperatures of from 30–80° C. and preferably from 30–35° C., excellent yields of the diether are obtained and the side reactions lessened. In order to avoid a local heat concentration, and hence the formation of by-products, it is advantageous to stir the mixture vigorously during reaction. On a laboratory scale the reaction is substantially complete after about 30 minutes. The mixture is still alkaline at this stage and should be made neutral with acid before distillation. Failure to acidify before distillation results in low yields of the diether with a corresponding increase of vinyl acetylene and 1-chlorobutadiene-1,3. The alkali metal chloride formed may be filtered off before distillation, but does not necessarily have to be removed.

The invention is illustrated by the following example:

Example

While cooling with Dry Ice, 18.4 g. of sodium was dissolved into 200 cc. of allyl alcohol. To the cooled mixture, at room temperature there was added 50 g. of 1,4-dichloro-2-butene, with mechanical stirring. No reaction occurred until the mixture was warmed. Then much sodium chloride formed and heat was evolved. After stirring for 20 minutes at the temperature of the reaction, the mixture was cooled and acidified with hydrochloric acid. To it was then added 500 cc. of water, whereupon two layers were formed. The upper layer was separated, washed twice with water, dried for 48 hours over calcium chloride and distilled under reduced pressure. In this way there was obtained a fraction, B. P. 88–94° C./9 mm. from which by two redistillations there was obtained substantially pure 1,4-diallyloxy-2-butene, B. P. 79° C./4 mm., $n_D^{20}$ 1.4565, $$d_{20}^{20}\ 0.9140\ \text{M. R.}$$

calcd. 50.27, found 50.01, and analyzing as follows:

|  | Per cent C | Per cent H |
|---|---|---|
| Calcd. for $C_{10}H_{16}O_2$ | 71.42 | 9.52 |
| Found | 71.52 | 9.52 |

Instead of the sodium alcoholate which is disclosed in the above examples, I may use other alkali metal alcoholates for the preparation of the corresponding 2-butene-1,4-diol diethers, for example, there may be employed potassium instead of sodium alcoholates.

The reaction may be effected in the presence of a solvent or a diluent, the employment of such a material being especially advantageous when the alcoholic component is a solid like cetyl alcohol. Likewise, reaction may be effected at either ordinary, increased or reduced pressure.

What I claim is:
1,4-diallyloxy-2-butene.

GEORGE F. DEEBEL.

REFERENCES CITED

The following references are of record in the file of this patent:

UNITED STATES PATENTS

| Number | Name | Date |
|---|---|---|
| 2,102,611 | Carothers | Dec. 21, 1937 |
| 2,038,593 | Muskat | Apr. 28, 1936 |

OTHER REFERENCES

Chemical Abstracts, vol. 30, page 4809 (1936). (Copy in Div. 6.)